Nov. 12, 1940.   R. REGER   2,221,721
TAILLIGHT AND BUMPER COMBINATION
Filed Nov. 1, 1938
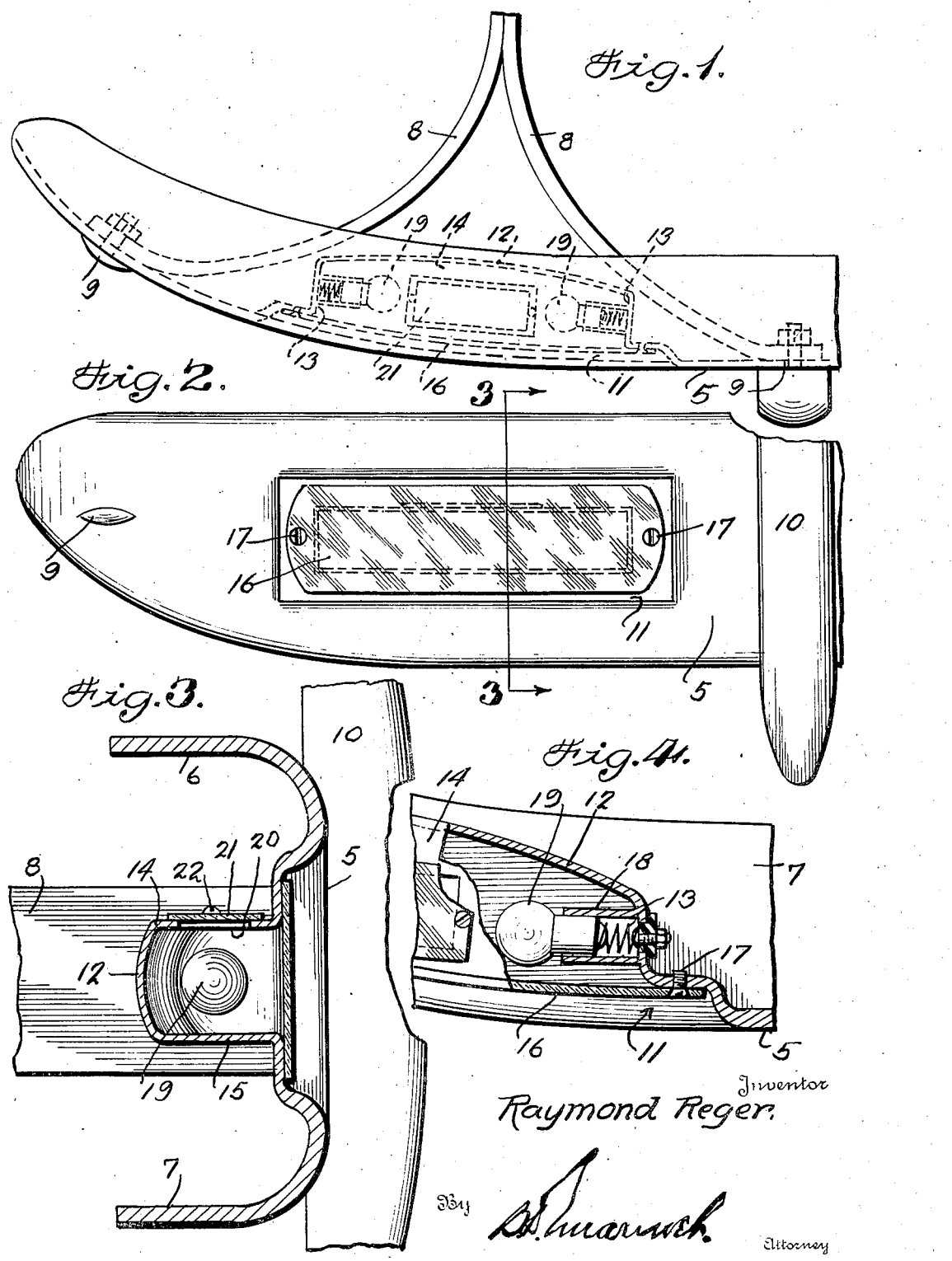
Inventor
Raymond Reger
By
Attorney Patented Nov. 12, 1940

2,221,721

UNITED STATES PATENT OFFICE 2,221,721

TAILLIGHT AND BUMPER COMBINATION

Raymond Reger, Anderson, Ind.

Application November 1, 1938, Serial No. 238,273

1 Claim. (Cl. 240—7.1)

This invention relates to certain new and useful improvements in a taillight and bumper combination.

The primary object of the invention is to provide a taillight and bumper combination for motor vehicles wherein the usual red signalling taillight is disposed in a housing carried by the left end of the rear bumper with the housing carrying a clear glass or lens in one wall thereof for directing light rays onto an adjacently positioned license tag, the taillight being carried by the bumper in a manner to prevent damage thereto.

With the above and other objects in view that will become apparent as the nature of the invention is better understood, the same consists in the novel form, combination and arrangement of parts hereinafter more fully described, shown in the accompanying drawing and claimed.

In the drawing,

Figure 1 is a top plan view of the left end of the rear bumper of a motor vehicle equipped with a taillight, Figure 2 is an elevational view of the left end of the rear bumper shown in Figure 1 and showing the red lens of the taillight set into a cavity or depression in the vertical wall of the bumper, Figure 3 is a vertical cross-sectional view taken on line 3—3 of Figure 2 showing the housing at the inner side of the vertical wall of the bumper for the taillight and an opening in the top wall of the housing closed by a clear glass or lens for directing light rays onto a license plate, and Figure 4 is a fragmentary horizontal sectional view.

Referring more in detail to the accompanying drawing, the left end of the rear bumper of a motor vehicle is illustrated as having a vertical wall 5 carrying top and bottom right angularly directed flanges 6 and 7, respectively, one of the brackets for the mounting of the bumper bar upon the motor vehicle being shown as comprising a pair of curved arms 8 having their divergent separated ends secured as at 9 at widely spaced points to the inner face of the vertical wall 5 of the bumper bar. A vertical bumper guard 10 is carried by the bumper bar adjacent the end thereof as illustrated.

As shown more clearly in Figures 2 to 4 the vertical wall 5 of the bumper bar between the anchored ends 9 of the bracket arms 8 is provided with an elongated rectangular depression 11, the bottom wall of the depression being struck inwardly to provide a housing having a rear wall 12, end walls 13, a top wall 14, and a bottom wall 15, the forward side of the housing being opened at the depression 11 and closed by a red glass plate or lens 16 anchored in position at its ends as at 17.

A lamp socket 18 is carried by the inner face of each end wall 13 of the housing and is in electrical communication (not illustrated) with the storage battery of the motor vehicle, a lamp 19 being mounted in each socket 18.

The top wall 14 of the housing is provided with an opening 20 that is closed by a clear glass plate or lens 21 anchored in position as at 22 so that light rays from the lamps 19 in the housing may be directed onto a license plate mounted in proximity of the bumper bracket 8.

The taillight and bumper combination eliminates the usually exposed taillight carried by a rear mud guard that is subject to damage and with the taillight mounted in the bumper bar as disclosed herein, damage thereto is prevented, the bumper guard 10 offering protection thereto as well as the location of the housing for the taillight at the inner side of the vertical wall 5 of the bumper bar.

From the above detailed description of the invention, it is believed that the construction and operation thereof will at once be apparent, and while there are herein shown and described the preferred embodiments, it is to be understood that minor changes may be made therein, such as will fall within the scope of the invention as claimed.

I claim:

In a taillight and bumper combination, an automobile bumper bar having a vertical wall, angularly directed flanges carried by the upper and lower edges of the vertical wall in superposed relation, the vertical wall having a depression therein, a lamp housing pressed-out from the bottom wall of the depression and forming an integral part of the bumper bar and disposed between the top and bottom flanges of the bumper bar with the open side of the housing disposed inwardly of the vertical plane of the outer side of the vertical wall, a light transmitting plate covering the open side of the housing, illuminating means in the housing and the top wall of the housing having an opening therein closed by a transparent plate whereby light rays may be directed onto an adjacently positioned license tag.

RAYMOND REGER.